(12) United States Patent
Zilberman et al.

(10) Patent No.: US 11,881,109 B2
(45) Date of Patent: Jan. 23, 2024

(54) METHOD, APPARATUS, AND SYSTEM FOR PROVIDING IN-PARKING NAVIGATION

(71) Applicant: HERE Global B.V., Eindhoven (NL)

(72) Inventors: Silviu Zilberman, Rishon le-Zion (IL); Harel Primack, Rishon le-Zion (IL); Ofri Rom, Ganey Tikva (IL); Ron Begleiter, Tel Aviv (IL)

(73) Assignee: HERE Global B.V., Eindhoven (NL)

( * ) Notice: Subject to any disclaimer, the term of this patent is extended or adjusted under 35 U.S.C. 154(b) by 99 days.

(21) Appl. No.: 17/562,507

(22) Filed: Dec. 27, 2021

(65) Prior Publication Data
US 2023/0206764 A1    Jun. 29, 2023

(51) Int. Cl.
*G08G 1/14* (2006.01)

(52) U.S. Cl.
CPC ............ *G08G 1/148* (2013.01); *G08G 1/142* (2013.01)

(58) Field of Classification Search
None
See application file for complete search history.

(56) References Cited

U.S. PATENT DOCUMENTS

| | | | |
|---|---|---|---|
| 10,373,494 B1 | 8/2019 | Krysiuk | |
| 10,672,272 B2 | 6/2020 | Guseynov et al. | |
| 2019/0163826 A1* | 5/2019 | Arquero | G06N 20/00 |
| 2020/0005641 A1* | 1/2020 | Park | G08G 1/168 |
| 2020/0018602 A1 | 1/2020 | Beaurepaire et al. | |

(Continued)

FOREIGN PATENT DOCUMENTS

| | | |
|---|---|---|
| CN | 106997687 A | 8/2017 |
| CN | 109931927 A | 6/2019 |

OTHER PUBLICATIONS

Turk et al., "Precise Vehicle Positioning for Indoor Navigation Via OpenXC", In Proceedings of the 4th International Conference on Vehicle Technology and Intelligent Transport Systems (VEHITS 2018), Jan. 2018, pp. 440-445.

(Continued)

*Primary Examiner* — John F Mortell
(74) *Attorney, Agent, or Firm* — DITTHAVONG, STEINER & MLOTKOWSKI

(57) ABSTRACT

An approach is provided for in-parking navigation based on mobile device sensor data, the resulted semantic events, and an estimated parking occupancy level. The approach, for example, involves receiving parking information from in-parking navigation system(s) of vehicle(s) and/or mobile device(s) associated with the vehicle(s) traveling in a parking facility with no or a positioning satellite coverage below a threshold. The parking information indicates parking spot location(s) occupied by the vehicle(s). The in-parking navigation system(s) determines the at least one parking spot location based on tracking multi-modal trajectories of the mobile device(s). The multi-modal trajectories comprise vehicle trajectory segment(s) traveling within the parking facility and pedestrian trajectory segment(s) traveling to/from pedestrian entry or exit point(s) of the parking facility. The approach also involves determining an occupancy level of the parking facility based on the parking information. The approach further involves providing the occupancy level of the parking facility as an output.

18 Claims, 11 Drawing Sheets

(56) References Cited

U.S. PATENT DOCUMENTS

2020/0217669 A1 7/2020 Hu et al.
2020/0410861 A1* 12/2020 Nellros ................. G08G 1/143

OTHER PUBLICATIONS

Wagner et al., abstract of "Improved Vehicle Positioning for Indoor Navigation in Parking Garages Through Commercially Available Maps", Conference Paper, , Published in: 2010 International Conference on Indoor Positioning and Indoor Navigation, Oct. 2010.
Wiki "Develop", retrieved from https://wiki.openstreetmap.org/wiki/Develop, last edit Nov. 6, 2021, 5 pages.

* cited by examiner

METHOD, APPARATUS, AND SYSTEM FOR PROVIDING IN-PARKING NAVIGATION

BACKGROUND

Providing accurate map data (e.g., road geometry, lane lines, etc.) is a key function for navigation, and/or for other location-based services. Generally, map object (e.g., parking spaces) locations can be measured by or inferred from using Global Positioning System (GPS) data or other equivalent positioning technologies (e.g., other Global Navigation Satellite Systems—GNSS), and/or by using dedicated vehicle sensors for tracking parking events. However, positioning satellite coverage may be unavailable and/or inaccessible, location sensors may be malfunctioning, unavailable, and/or inaccessible due to signal interference, loss of line-of-sight to orbiting satellites, etc., to provide such navigation, and/or other location-based services. Accuracy of GNS S may not be sufficient as well. Another parking issue is about parking facility occupancy rates. Mobile parking applications support user to pre-book parking spots yet there is no guarantee that the parking facility will have spaces as the parking facility operator does not necessarily monitor the parking space availability and report to the applications. As a result, service providers face significant technical challenges to navigate a vehicle to and in a parking facility without positioning satellite coverage.

SOME EXAMPLE EMBODIMENTS

Therefore, there is a need for an approach for in-parking navigation (e.g., to navigate vehicles to and/or in a parking facility with vacant spaces and without positioning satellite coverage, to navigate the vehicles to vacant spaces in a parking facility, etc.) based on an estimated parking occupancy level (of a parking lot, floor, zone, etc.). For instance, a navigation service provider can estimate an occupation level based on mobile device sensor data collected using mobile applications and/or data from the parking facility operators. The estimated parking occupancy level can be determined based on multi-modal trajectories collected using mobile devices, detecting a sequence of semantic events, distance estimation, machine learning, etc. The occupation level data and multi-model parameters from mobile devices can be used to navigate vehicles to a parking facility with vacant spaces, and then to the vacant spaces.

According to one embodiment, a method comprises receiving parking information from one or more in-parking navigation systems of one or more vehicles, one or more mobile devices associated with the one or more vehicles, or a combination thereof traveling in a parking facility with no or a positioning satellite coverage below a threshold. The parking information indicates at least one parking spot location occupied by the one or more vehicles. The in-parking navigation systems determine the at least one parking spot location based on tracking one or more multi-modal trajectories of the one or more mobile devices. The one or more multi-modal trajectories comprise one or more vehicle trajectory segments traveling within the parking facility and one or more pedestrian trajectory segments traveling to or from one or more pedestrian entry or exit points of the parking facility. The method also comprises determining an occupancy level of the parking facility based on the parking information. The method further comprises providing the occupancy level of the parking facility as an output.

According to another embodiment, an apparatus comprises at least one processor, and at least one memory including computer program code for one or more computer programs, the at least one memory and the computer program code configured to, with the at least one processor, cause, at least in part, the apparatus to receive parking information from one or more in-parking navigation systems of one or more vehicles, one or more mobile devices associated with the one or more vehicles, or a combination thereof traveling in a parking facility with no or a positioning satellite coverage below a threshold. The parking information indicates at least one parking spot location occupied by the one or more vehicles. The in-parking navigation systems determine the at least one parking spot location based on tracking one or more multi-modal trajectories of the one or more mobile devices. The one or more multi-modal trajectories comprise one or more vehicle trajectory segments traveling within the parking facility and one or more pedestrian trajectory segments traveling to or from one or more pedestrian entry or exit points of the parking facility. The apparatus is also caused to determine an occupancy level of the parking facility based on the parking information. The apparatus is further caused to provide the occupancy level of the parking facility as an output.

According to another embodiment, a computer-readable storage medium carries one or more sequences of one or more instructions which, when executed by one or more processors, cause, at least in part, an apparatus to receive parking information from one or more in-parking navigation systems of one or more vehicles, one or more mobile devices associated with the one or more vehicles, or a combination thereof traveling in a parking facility with no or a positioning satellite coverage below a threshold. The parking information indicates at least one parking spot location occupied by the one or more vehicles. The in-parking navigation systems determine the at least one parking spot location based on tracking one or more multi-modal trajectories of the one or more mobile devices. The one or more multi-modal trajectories comprise one or more vehicle trajectory segments traveling within the parking facility and one or more pedestrian trajectory segments traveling to or from one or more pedestrian entry or exit points of the parking facility. The apparatus is also caused to determine an occupancy level of the parking facility based on the parking information. The apparatus is further caused to provide the occupancy level of the parking facility as an output.

According to another embodiment, a computer program product may be provided. For example, a computer program product comprising instructions which, when the program is executed by a computer, cause the computer to receive parking information from one or more in-parking navigation systems of one or more vehicles, one or more mobile devices associated with the one or more vehicles, or a combination thereof traveling in a parking facility with no or a positioning satellite coverage below a threshold. The parking information indicates at least one parking spot location occupied by the one or more vehicles. The in-parking navigation systems determine the at least one parking spot location based on tracking one or more multi-modal trajectories of the one or more mobile devices. The one or more multi-modal trajectories comprise one or more vehicle trajectory segments traveling within the parking facility and one or more pedestrian trajectory segments traveling to or from one or more pedestrian entry or exit points of the parking facility. The computer is also caused to determine an occupancy level of the parking facility based on the parking information. The computer is further caused to provide the occupancy level of the parking facility as an output.

According to another embodiment, an apparatus comprises means for receiving parking information from one or more in-parking navigation systems of one or more vehicles, one or more mobile devices associated with the one or more vehicles, or a combination thereof traveling in a parking facility with no or a positioning satellite coverage below a threshold. The parking information indicates at least one parking spot location occupied by the one or more vehicles. The in-parking navigation systems determine the at least one parking spot location based on tracking one or more multi-modal trajectories of the one or more mobile devices. The one or more multi-modal trajectories comprise one or more vehicle trajectory segments traveling within the parking facility and one or more pedestrian trajectory segments traveling to or from one or more pedestrian entry or exit points of the parking facility. The apparatus also comprises means for determining an occupancy level of the parking facility based on the parking information. The apparatus further comprises means for providing the occupancy level of the parking facility as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. In particular, "speed" and "velocity" are used and can be used interchangeably along this manuscript.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing in-parking navigation based on mobile device sensor data, the resulted semantic events, and an estimated parking occupancy level are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent or similar arrangement. In other instances, well-known structures and devices are shown in block diagram form in order to avoid unnecessarily obscuring the embodiments of the invention.

Figure 1:
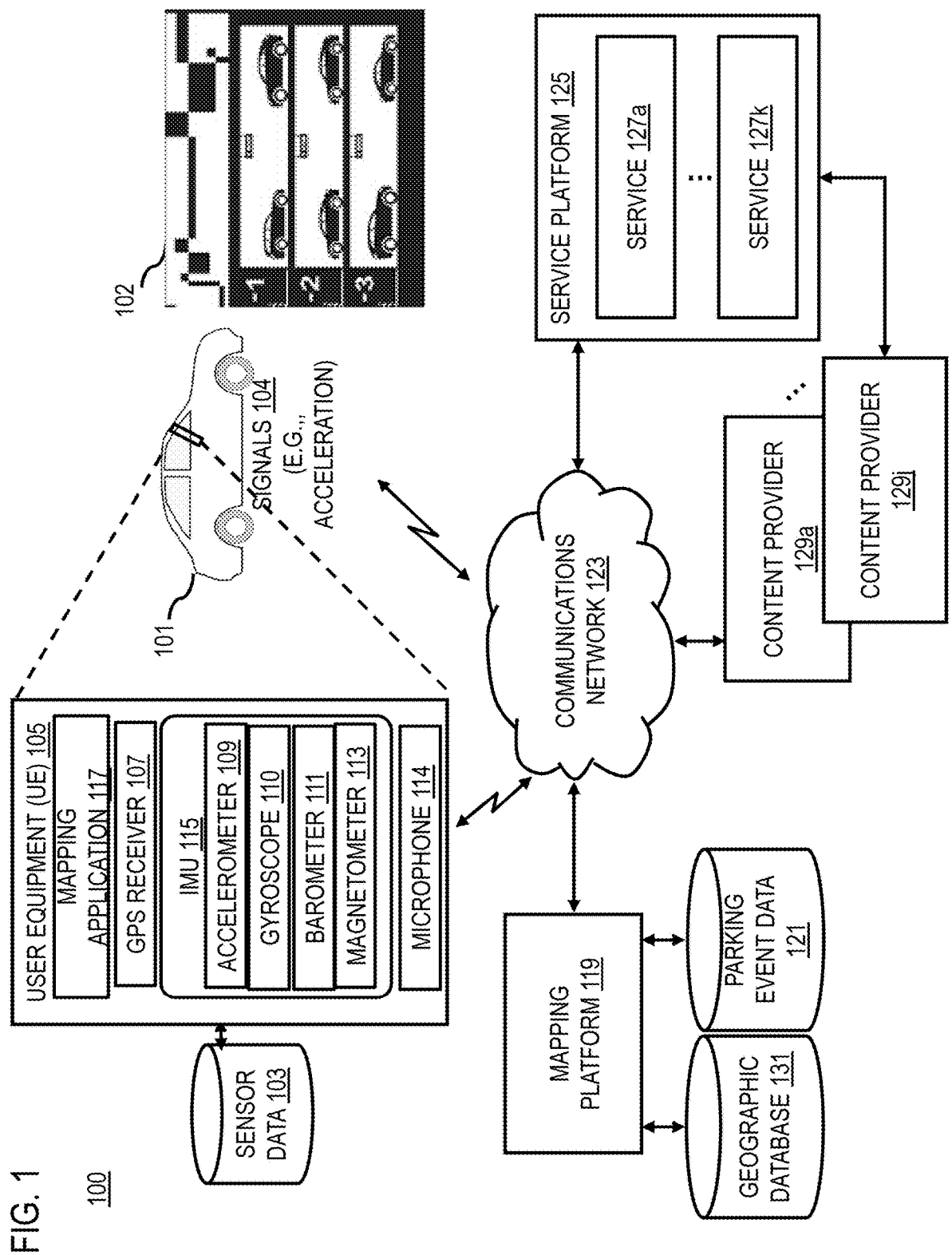
FIG. 1 is a diagram of a system capable of providing in-parking navigation based on an estimated parking occupancy level, according to one embodiment.

FIG. 1 is a diagram of a system capable of providing in-parking navigation based on an estimated parking occupancy level, according to one embodiment. Embodiments of the technology described herein relate to estimating the moving distance of a mobile device using sensor data, thereby determining parking spot locations and/or orientations, as well as estimated parking occupancy level of a parking within a parking lot, floor, zone, etc., and navigating a vehicle in the parking facility without positioning satellite coverage.

In on-ground, open parking lots, drivers can use standard navigation, and it is easy to spot and record parking locations, then map the parking spaces. When parking facilities are located in buildings or underground, there are several challenges in meeting the same level of user experience. When parking garages are located inside buildings (e.g., office buildings, apartments, etc.) and/or underground (e.g., subway stations, opera houses, concert halls, etc.), location sensor data (e.g., GPS signals) is unavailable or unreliable. By way of example, underground and indoor parking facilities, underground city tunnels, bunkers, etc. have no GPS reception. As another example, some conference centers, concert halls, opera houses, etc. simply block wireless signal reception. This results in a sharp contrast in user navigation experience, due to severe lack of information (e.g., parking facility maps, vacant parking spot locations, vehicle parked locations, etc.) and hence convenience. For instance, when travelling inside a parking facility without GPS coverage, the GPS navigation system becomes useless. It is hard to for the user to return to a parked car in a big parking facility, since all levels look alike. It is common for the user to spend considerable amount of time to look for the car. As another instance, as the car heads out the parking facility, it may take several tens of seconds before the GPS system locks in to calculate the correct position and heading. This results in, in many cases, misorientation such that the driver taking the wrong turn when exiting the parking facility, thus wasting time and energy.

On the other hand, parking facility operators may have parking maps/plans of their facilities; however, such parking maps/plans are not publicly available or in a format compatible with vehicle navigation services. When GPS signal is unavailable or unreliable, the parking facility operators can provide custom solutions, such as placing hardware beacons within the parking facilities, and mapping the beacons signal at every relevant spot. However, the custom solutions are non-scalable since they are nonstandard and require investment in specialized hardware and software, as well as continuous maintenance, calibration and update by the parking operators. Moreover, even if such custom solutions are in place, the information is the property of the parking facility operators and may not be available to the public.

In addition, parking facilities on their own are usually not the final destinations of users. Mobile parking applications may offer a user a parking facility in the vicinity of the user's destination, but often there are multiple options for reservations yet there is no guarantee the parking facility will have spaces as the parking facility operator does not necessarily monitor the applications. Arriving at a crowded parking facility is frustrating and may require driving to the next parking facility to find a vacant space. There is a need for a parking facility occupancy estimation without involving the parking facility operator, or for providing the parking facility occupancy estimation on top of the information from the parking operator.

To address the technical challenges related to navigation to and in a parking facility in absence of GPS/GNSS signals, the system 100 of FIG. 1 introduces a capability to track movements of vehicles 101 in a parking facility 102 without positioning satellite coverage based on sensor data 103 (e.g., from accelerometers, gyroscopes, magnetometers, barometers, etc.) collected by user equipment (UE) devices 105 from which a parking occupancy level of the parking facility 102 can be estimated, thereby navigating a subsequent vehicle 101 to and in the parking facility 102.

The system 100 can proceed with collecting crowd-sourced sensor data of the vehicle 101 in the parking facility 102, to determine parked spaces and an occupancy level of the parking facility 102. For instance, the sensors can be embedded in any standard mobile device, such as an inertial measurement unit (IMU) in the UE 105 having accelerometer, gyroscope, magnetometer, as well as other sensors such like the barometer, pedometer and so on. When GPS signal is not available in the parking facility 102 (e.g., positioning satellite coverage unavailable indoor/underground, a GPS receiver 107 of the UE 105 is broken, etc.) except the entrance/exit points of the parking facility 102, acceleration data measured by an accelerometer (e.g., an accelerometer 109) can be used to calculate movement distance data and provide details of a parking event without GNSS/GPS signals. In one embodiment, the sensor data 103 includes, for instance, measured acceleration signals from UEs 105 (e.g., smartphones or equivalent mobile devices) for estimating the vehicles 101 moving distances within the parking facility 102, turn events, inclination change and parking semantic events.

In one embodiment, the GPS receiver 107, the gyroscope 110, the barometer 111, the magnetometer 113, etc. may be included in an inertial measurement unit (IMU) 115 along with other sensors such as, but not limited to, a microphone 114. The GPS receiver 107 is used as an example. The broader category would be the global navigation satellite systems (GNSS), such as GPS, GALILEO, GLONASS and BEIDOU. Further, positioning can be performed using a combination of GNSS and Radio Signal based systems, such as Wi-Fi, Bluetooth, Bluetooth low energy, 2/3/4/5G cellular signals, ultra-wideband (UWB) signals, etc. of the UE 105. By way of example, when using IMU sensors in the UE 105, the system 100 can determine a rotation matrix between a vehicle frame of reference and a device frame of reference, to convert the sensor data and determine vehicle coordinates and directions of motion accordingly.

Although using accelerometers in mobile devices can be unreliable due to drift error accumulation, the system 100 can apply this approach for the short distances/times that characterize parking maneuvers. The accuracy is not essential for such application, e.g., even 50% errors in distance estimations are good enough for detecting these short distance parking maneuvers, typically in 5-10 meters. The system 100 can use the last known state (e.g., position and velocity) and integrate twice over the acceleration to get the updated locations and/or moving distances of the vehicles 101. Although the measurement error of the accelerometer 109 induces a drift in velocity and location estimation, the distance and/or trajectory of the vehicle 101 can be estimated only for a few seconds before the error accumulation makes it useless. The semantic events (e.g., moving distances, turn events, etc.) determined based on mobile device data can be mapped to specific positions within the parking facility, based on prior knowledge of the parking facility map that was determined based on mobile device sensor data. The estimated locations of parking spaces can serve as a recalibration for the absolute positions of the parking spaces.

For instance, the sensor data 103 can be collected from one or more gyroscopes (e.g., a gyroscope 110), one or more atmospheric pressure meters (e.g., a barometer 111), one or more magnetic field meters (e.g., a magnetometer 113), one or more microphones (e.g., a microphone 114), etc. to estimate moving distances, turn angles, inclination changes, etc. of the vehicle/user movements within the parking facility 102, to piece together a vehicle/user trajectory segment (e.g., a trajectory of a vehicle's movement of entering/exiting the parking facility 102) and/or a pedestrian trajectory segment (e.g., a trajectory of a pedestrian's movement of entering/exiting the parking facility 102).

For instance, the system 100 can detect and/or quantify vehicle turns and lane changes by using a standard sensor application programming interface (API) to obtain a rotation vector from a device frame of reference to a vehicle frame of reference, thereby obtaining the azimuthal and inclination angles, thereby determining parallel, perpendicular or at an angle relative to an aisle in a garage, on the left or right side of the aisle, as well as a maneuvering direction into a parking spot (e.g., in forward or reverse drive), etc.

In addition to or in place of the above-described physical sensors (e.g., accelerometer, gyroscope, magnetometer, barometer, etc.), the system 100 can deploy virtual sensors provided by an operation system of the UE 105, such as an activity monitor, a rotation sensor, a gravity sensor, a step counter (e.g., a pedometer), etc., to determine the vehicle/user movements within the parking facility 102.

In one embodiment, the system 100 can generate a multi-modal trajectory of a mobile device (e.g., the UE 105) to estimate parking locations/orientations, pedestrian entry/exit points (e.g., escalators, elevators, stairs, etc.), etc. of the parking facility 102. The multi-modal trajectory can involve two or more modes of transport, such as walking, wheelchairs, rollerblades, roller boards, skateboards, bicycles, scooters, e-scooters, motorcycles, passenger cars, shared vehicles, buses, shuttles, etc.

Figure 2A:
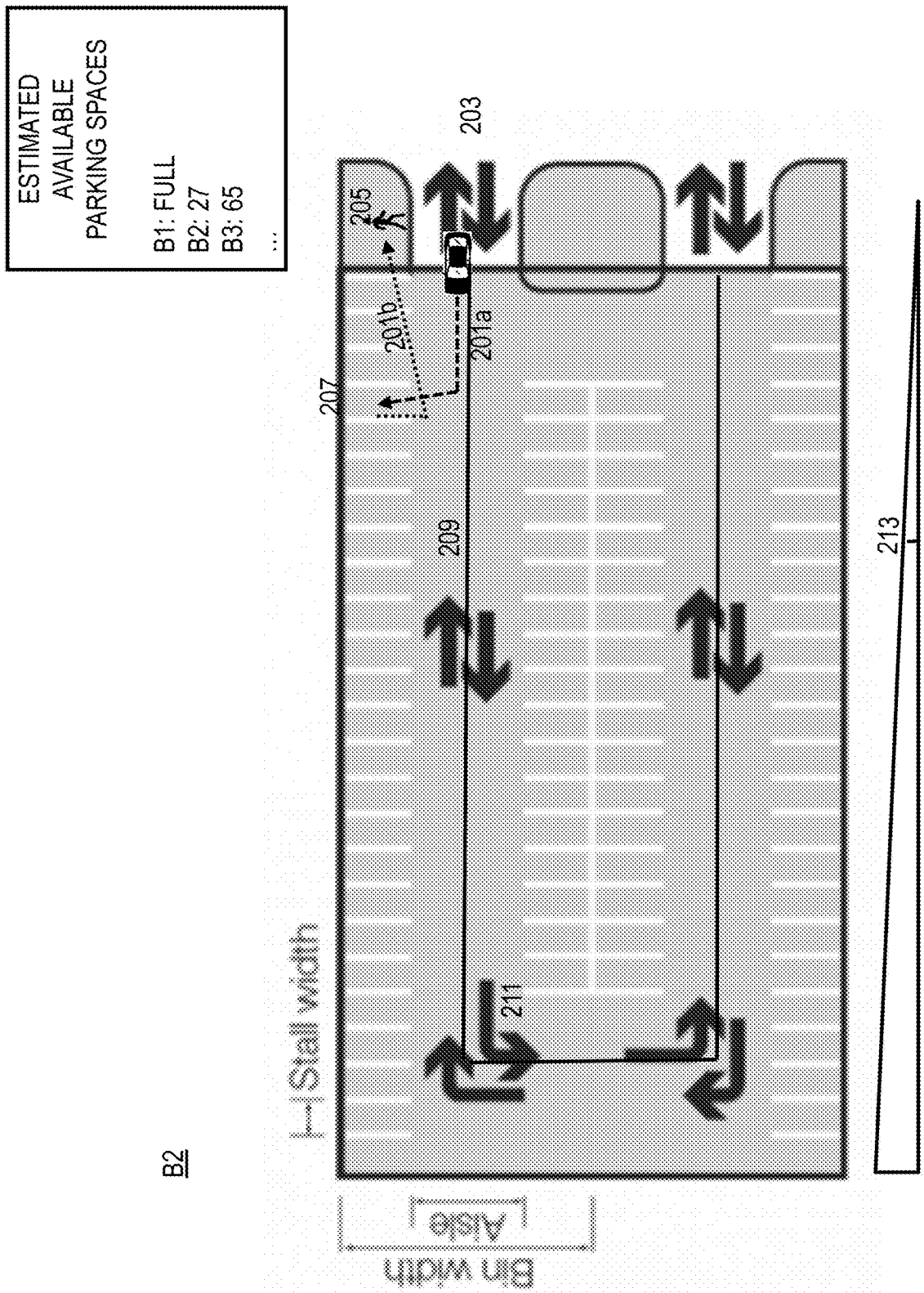
FIG. 2A a conceptual diagram of estimating an occupancy level of an example parking facility by tracking multi-modal trajectories of mobile devices without positioning satellite coverage, according to one embodiment.

FIG. 2A is a conceptual diagram of estimating an occupancy level of an example parking facility by tracking multi-modal trajectories of mobile devices without positioning satellite coverage, according to one embodiment. For instance, a multi-modal trajectory 201 of a mobile device (e.g., the UE 105) generated based on sensor data (e.g., the sensor data 103), can include a vehicle trajectory segment 201a (e.g., of a parking event of the vehicle 101 into a parking spot 207) and a pedestrian trajectory segment 201b (e.g., of a walking event of a user of the UE 105).

During the parking event, the UE 105 carried by the vehicle 101 travelled into an underground level B2 of the parking facility 102 via an entry 203, and then stops at the parking spot 207. During the walking event, the UE 105 carried by the user travelled from the parking spot 207 to a pedestrian entry/exit 205 of the parking facility 102. For instance, the parking spot 207 has dimensions of 9 feet wide by 18.5 feet long.

In this case, by clustering a lot of vehicle trajectory segments 201a collected mobile device sensor data over a period of time (e.g., days, weeks, months, etc. depending on how busy the parking facility 102 is), the system 100 can determine locations of parking spots 207, one or more aisles/driveways 209, turn angles 211, inclination changes/angles 213, etc. on the underground level 102a of the parking facility 102. By clustering a lot of pedestrian trajectory segments 201b collected via the period of time, the system 100 can validate the locations of parking spots 207, and determine one or more pedestrian entries/exits 205 (e.g., escalators, elevators, stairs, etc.), etc. on the underground level 102a of the parking facility 102.

Real time occupancy level can be determined when UEs 105 and/or vehicles 101 using the system 100 (e.g., an "in-parking navigation system"). An in-parking navigation system refers to a parking system to be used in an indoor or underground parking lot or other lots where positioning satellite coverage is unavailable such that semantic events are used to track and locate parking spots.

For instance, the system 100 can assume the locations of parking spots 207 as parked spots, and the remaining spots as vacant spots. The system 100 can calculate an occupancy level of the parking facility 102 based on the number of the parked spots and/or the number of the vacant spots. In an ideal case where most users use the in-parking navigation system, the system 100 can easily track the number of vehicles 101 entering/exiting, thus forming detailed estimate of the occupancy at a single parking spot level. The total number of parking spots is known from a parking facility map. By way of example, the system 100 displays estimate occupancy levels 215 on the UE 105 as "Estimated Available Parking Spaces: B1: FULL, B2: 27, B3: 65" in FIG. 2A. Even if only a fraction of the users use the in-parking navigation system, still, a good estimation as to the level of occupancy can be determined by their actual parking locations; e.g., if none of the users at a given time use level A of a specific parking lot, it can be inferred that level A is highly or fully packed, and thus not available for further parking in the present time.

The semantic events can be the building blocks for making crowed-sourced maps of parking facilities. The system 100 can utilize any parking facility maps that are publicly available and in a format usable by navigation software, whether they are built from the semantic events, or other sources, e.g., from parking facility owners or operators.

With the parking facility maps, the system 100 can follow the route of a vehicle or a pedestrian by tracking the turns, ramps, inclinations, heights, distances and other semantic events, and recording the parking spot locations on a parking facility map. Consequently, the system 100 can provide a turn-by-turn navigation, for instance, to guide the vehicle towards a vacant parking spot or towards an exit.

Since the system 100 has the parking facility map and procedure for tracking the vehicle position on the parking facility map, the system 100 can generate navigation instructions, similar to user experience in standard navigation applications for in-parking navigation, such as from an entrance to a parking area with low occupancy, from an entrance to a parking area near a specific pedestrian exit point (e.g., near a theater entrance, a specific building or store, etc.), from a parking spot to a general or specific exit based on the final destination of the user, etc.

The system 100 can ensure a smooth transition between out-parking (where there is positioning satellite coverage) and in-parking (where there is no positioning satellite coverage). When entering the parking facility 102, given the knowledge of which entry point is used (based on latest available GPS data), the system 100 can immediately switch to in-parking navigation, with the parking facility map. When exiting the parking facility 102, based on the parking facility map, the system 100 can determine the heading of the vehicle 101 relative to the street, and continue with in-parking navigation mode also outside the parking facility 102 (tracking turns) until solid GPS position signal is established and the heading is known.

More realistically, only a portion of users use the in-parking navigation system 100. Even when only a portion of UEs 105 and/or vehicles 101 using the system 100, the system 100 can still estimate the occupancy level of the parking facility 102 using, e.g., a prediction model based on features such as a parking time (once entered the parking facility 102), a distance to the parking spot from the entry point, daily/weekly parking statistics, etc.

For instance, the system 100 can use occupancy hints to estimate an occupancy level of the parking facility 102 and direct vehicles 101 into vacant lots. Although the system 100 may not have detailed real-time information about the occupancy of each parking spot at any given time, the system 100 can use recent parking events to get estimates about occupancy level(s) of zone(s) within the parking facility 102. By way of example, if no vehicle is parking on the B1 floor in the last (for example) 10 minutes and all vehicles went to the B2 floor. It is reasonable to assume that the B1 floor is quite full, so the system 100 can guide vehicles directly to the B2 or B3 floors.

In one embodiment, the system 100 can estimate the occupancy level based on a distribution of time from entering the parking facility 102 to reaching a parking spot 207 based on past parking statistics. For instance, a more vacant parking facility will exhibit a short time distribution centered around the time taken to reach the parking spots nearest to the entrance. The higher the occupancy level, the longer it takes to park.

As another instance, when recent parking events were mostly on the 2nd floor/level and above of the parking facility 102, the system 100 can estimate that the 1st floor/level is mostly occupied. Similarly, when recent parking events were in zones distant from the entrance, the system 100 can estimate that the zones closer to the entrance are more occupied. Using these features, the system 100 can construct models for estimating the occupancy level of the whole parking facility 102 and/or per zone/floor), to get qualitative estimates, such as low/medium/high.

In another embodiment, the system 100 can validate the estimates, e.g., when an average parking time is very short in the past 10 minutes as low occupancy, or when cars refrain from entering the parking facility 102, or entering then leaving shortly after without parking as high occupancy.

With the estimated occupancy level, the system 100 can determine which parking facility, which zone/floor of a parking facility, or a combination thereof to recommend to the user via the UE 105 or to navigate the vehicle 101 to it.

The system 100 can gather parking information over time to generate one or more occupancy prediction models. These predictions can be used in standard navigation applications, to direct vehicles towards parking facilities near their target destinations, which have reasonable vacancy levels at the expected arrival times.

In many real-world scenarios, parking facilities are proxies for the navigation destination. In such use-cases, the demand of vacancy is curial for having a satisfying navigational experience. Using the above occupancy information collected over time, the system 100 can construct predictive machine learning and/or artificial intelligence models and train the models to predict occupancy levels. Such predictions would aid navigation applications to direct users towards optimized parking facilities near their destinations, where there is a high probability of finding vacant spots, at the (future) time of arrival. Optional pricing and other preferences and priorities may be affect the models. Such models can rely on a rich set of features/factors such as historical occupancy at each parking facility, correlations between nearby parking facilities, weather information, time of day, day of week, month, special events and so on. Method for time series forecast may range from regression models, to ARIMA, reinforcement learning, deep learning, etc.

In one embodiment, the system 100 can train a machine learning model to identify the one or more parking spot locations, the one or more parking occupancy levels, or a combination thereof based on the sensor data, i.e., a parked spot/occupancy level model (such as "rule based" or "probabilistic") to detect and/or infer parked spot/occupancy level in a parking facility. By analogy, the system 100 can train the above-describe parked spot/occupancy level machine learning model to identify parked spots and a occupancy level in a parking facility as discussed.

In one embodiment, the system 100 in connection with a machine learning system can select respective factors such as pricing, user preferences, user priorities, correlations among nearby parking facilities, weather, time of a day, day of a week, day of a month, sensor data, map data, driving behaviors, parking behaviors, vehicle state data, transport modes, moving patterns, driveway topology, etc., to determine the machine learning model. In one embodiment, the system 100 can train the machine learning system to select or assign respective weights, correlations, relationships, etc. among the factors, to determine machine learning model for different vehicle(s)/fleets, etc. In one instance, the machine learning system can continuously provide and/or update the machine learning model (e.g., a support vector machine (SVM), neural network, decision tree, etc.) during training using, for instance, supervised deep convolution networks or equivalents. In other words, the machine learning system can train the machine learning model using the respective weights of the factors to most efficiently select optimal factors/weightings for different scenarios in different regions.

In another embodiment, the machine learning system includes a neural network or other system to compare (e.g., iteratively) driver behavior patterns, vehicle paths features, etc.) to detect parking spots/orientations, and/or pedestrian entry/exit points. In one embodiment, the neural network of the machine learning system is a traditional convolutional neural network which consists of multiple layers of collections of one or more neurons (which are configured to process a portion of an input data). In one embodiment, the machine learning system also has connectivity or access over a communication network 123 to parking event data 121 and/or a geographic database 131.

In one embodiment, the system 100 can improve the process 400 using feedback loops based on, for example, user behavior and/or feedback data (e.g., from passengers). In one embodiment, the system 100 can improve the machine learning model using user behavior and/or feedback data as training data. For example, the system 100 can analyze correctly identified parking spots/orientations and/or pedestrian entry/exit points, missed parking spots/orientations, and/or pedestrian entry/exit points, correctly identified occupancy levels, missed occupancy levels, etc. to determine the performance of the machine learning model.

In another embodiment, the system 100 can determine orientations of the parking spots 207 based on the clustered vehicle trajectory segments 201*a*. A parking spot can be oriented as perpendicular, parallel, or angular, or more specifically as left forward, right backward, etc. Example can include: (1) perpendicular (e.g., left/right forward, left/right reverse, etc., (2) parallel (e.g., left/right forward parallel, left/right reverse parallel, etc.), (3) angular (e.g., left/right forward angular, left/right reverse angular, etc.), etc.

Much higher quality accelerometers exist on market but not embedded in the UEs 105, generally due to size/price constraints. However, as technology improves, more accurate IMU units can be embedded in the UEs 105. The parking spot tracking will be more accurate by corroborating locations and distances with GPS data.

In another embodiment, the system 100 can take advantage of independent speed measurements based on the magnetic field in the vehicle. The system 100 can detect a vehicle speed using a frequency response of the magnetic field in the vehicle, since magnetometer is sensitive to changes in the magnetic field and the vehicle tires in most cases are steel-belted radial tires that tend to be magnetized. The net effect is that tires behave as rotating magnets such that the tire rotation frequency (related to speed) can be measured with the magnetometer 113.

In other embodiments, the system 100 can collect crowd-sourced sensor data in a parking facility as follows. For instance, sensor data is collected over multiple sessions (e.g., carried out by volunteers, professionals, etc.) when vehicles are entering into the parking facility, parked in parking spots, and then the users left through pedestrians exists. The sessions can be resumed when the users returned to the vehicles and left the parking facility. Ideally, these sessions cover all the available parking spots, all available vehicle entrance/exit locations, and all pedestrian entrances/exits in the parking facility.

The system 100 can determine locations of the entrance/exit points of the parking facility, using GPS or some other source of location information. The system 100 can determine vehicle headings when driving into the parking facility. The heading information is optional. The absence of the heading information does not affect the quality of the estimated parking spot locations and the occupancy level of the parking facility. The system 100 assumes that the UE 105 is placed in an arbitrary position in the car, yet stationary in the vehicle during the vehicle tracking sessions, such that the system 100 can use a rotation matrix to convert the sensor data from between a device frame of reference to a vehicle frame of reference thereby determine vehicle moving distances, directions of motion, etc. in the parking facility. Under a less desirable scenario, the system 100 requires the UE 105 stationary with respect to the vehicle only during turns and inclination changes, which will affect the quality of the parking event tracking (e.g., distance estimation).

For instance, the system 100 can start a data collection session from a parking lot entrance for a UE 105, and monitor a time series of a set of mobile device sensors at a frequency defined based one or more accuracy requirements. Not all sensors of the UE 105 are required since some sensors convey similar information; however, redundancy can improve the robustness of the system and/or verify the accuracy of the system. The sensors can include one or more physical sensors (e.g., accelerometer(s), gyroscope(s), magnetometer(s), barometer(s), etc.), one or more virtual sensors (e.g., speed sensor(s), gravity sensor(s), rotation vector(s), heading/azimuth sensor(s), altimeter(s), activity sensor(s), steps counter(s), etc.), or a combination thereof.

In another embodiment, the system 100 can monitor for each UE 105 for semantic events as a function of time, such as car idle states (e.g., car idle with engine on, car stopped with engine off, etc.), turn events (e.g., turn angle(s), turn velocity, radius of curvature, etc.), inclination change events, car parking event parameters (e.g., parking angle relative to the driveway, on the left or right side of the driveway, etc.), usage of escalators/elevators/stairs, etc.

For instance, the system 100 can detect vehicle idle states, such as vehicle stop with engine off, vehicle idle with engine on, etc., using a frequency response of the magnetic field in the vehicle (e.g., idle=speed zero), a barometric pressure gradient measured by sensitive pressure sensors (e.g., idle=zero pressure gradient), vibrations cause by a vehicle engine (e.g., idle=time–independent engine vibration), etc. As another instance, the system 100 can detect and/or quantify vehicle turns by (1) following the trajectory of the vehicle 101, or (2) obtaining a rotation vector from a device frame of reference (DFOR) of the UE 105 to a vehicle frame of reference (VFOR) of the vehicle 101, to convert gyroscope or other sensor data from the UE 105 to the VFOR thereby obtaining the azimuthal and inclination angle. As another instance, the system 100 can identify lane changes (each of which includes two opposite small turn events) using the turn data.

In one embodiment, the system 100 can process the crowd-sourced sensor data to map parking spaces, aisles/driveways (e.g., as connecting two junctions), etc. Junctions are identified by accumulating turn statistics and/or inclination changes thereat, and a distance between two junctions can be approximated by integration over accelerometer data of the IMU 115 of the UE 105.

In OpenStreetMap (OSM), the basic elements form a conceptual data model of a physical world consist of "Nodes", "Ways" and "Relations." A node consists of a single point in space defined by its latitude, longitude, altitude and node id. A way normally represents a linear feature on the ground (such as a road, wall, or river). Technically, a way is an ordered list of nodes which normally also has at least one tag or is included within a Relation. Relations are used to model logical (and usually local) or geographic relationships between objects. For instance, the system 100 can record parking event statistics and place on nodes along a way connecting two junctions. Such nodes may contain typically 1-2 parking spots, corresponding to (1) one parking spot on the left or right, or (2) two parking spots on both left and right sides of the way.

In addition, the system 100 can apply various constraints that might apply to improve accuracy. For instance, the ways in parking facilities follow straight lines, with parking spots either perpendicular to the way, or at a given fixed angle to be deduced from the parking events statistics. In-between junctions, there is an integer number of parking spots of a fixed (generally known) width. The width can be determined based on local authority planning requirements for parking facilities, and used as an additional constraint to improve the distance estimation between junctions. When accumulating the distances driven between the known entry and exit points of the parking facility, the system 100 can set the distance close to the GPS-based distance between the walls of the parking facility, yielding yet another distance scaling constraint.

Figure 2B:
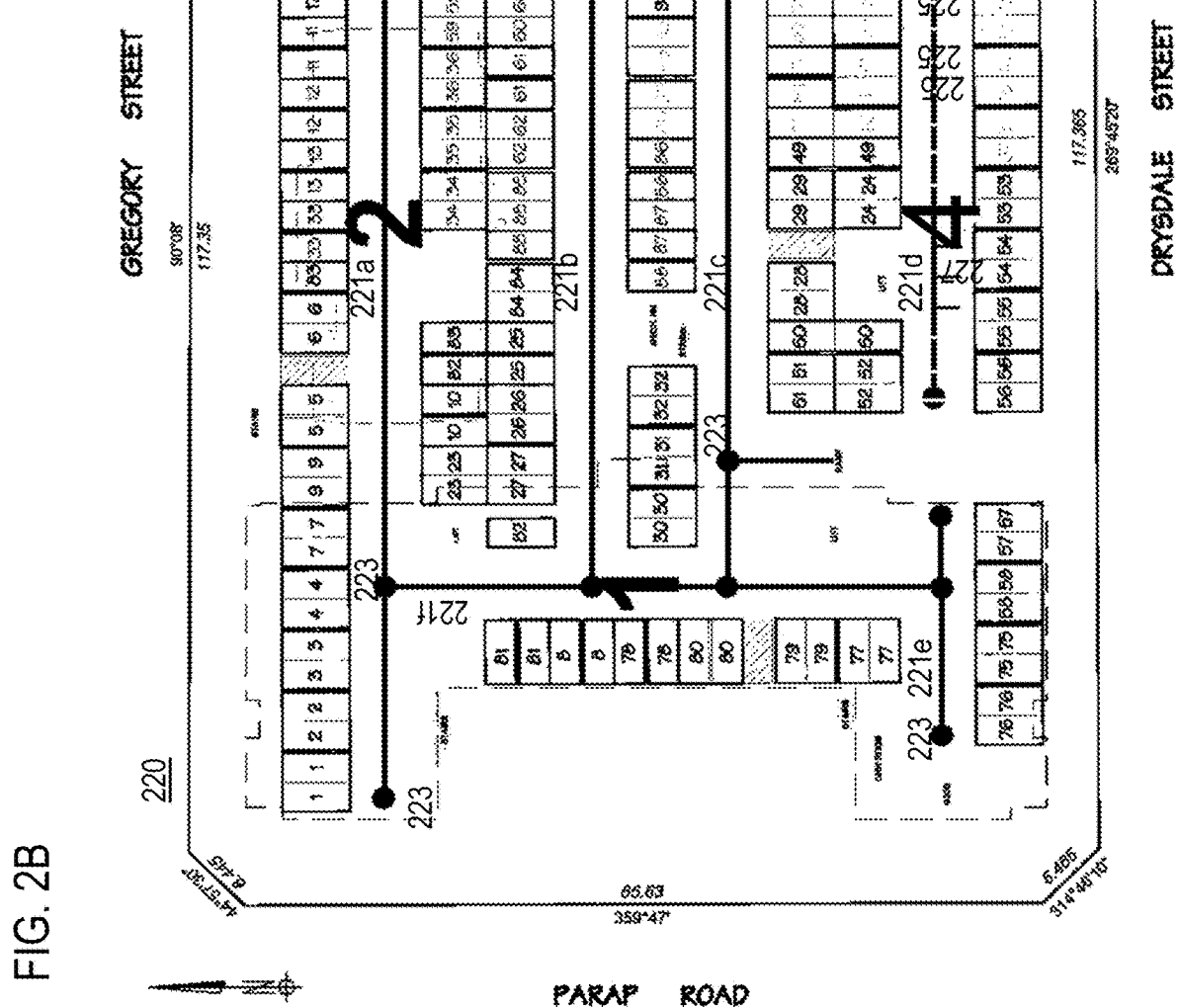
FIG. 2B is a diagram of an example parking lot, according to one embodiment.

FIG. 2B is a diagram of an example parking lot 220, according to one embodiment. In FIG. 2B, the solid lines represent aisles/driveways 221 (e.g., 221a-221g), dots on the aisles/driveways represent junction nodes 223, gray lines represent two-sided parking nodes 225, and short lines represent one-sided parking nodes 227. FIG. 2B only depicts a small subset of the parking nodes in the example parking lot 220 for illustration purposes.

In one embodiment, the system 100 can take into account the limited accuracy of the IMU unit 115 in the UE 105, which can lead to drift errors, by incorporating other sources of information as additional constraints. Considering a typical distance between junctions is a few tens of meters, the drift error should be sufficiently small. For instance, the system 100 can use altimeter data, combine gyro and speed estimation based on magnetometer measurements, etc. to filter undesirable data (e.g., embedded in a Kalman filter), to obtain far better distance estimates between junctions and greatly improve the accuracy.

In another embodiments, the system 100 can determine locations of pedestrian entry/exit points, such as stairs/elevators/escalators, based on the above-described sensor data, including the step counter (pedometer) data which is available in a standard mobile device. Once the user left the vehicle 101, the user usually heads towards the nearest exit. The system 100 can use an activity application programming interface (API) to identify a walking mode and count steps. When reaching the exit point, the system 100 can identify stairs/elevator/escalator using a probability density map and/or machine learning. To get a rough distance estimate between the parking spot and a given exit, the system 100 can multiply the number of steps by an average step length. Alternatively, as IMU units in mobile device become more accurate, the system 100 can integrate over accelerometer data to obtain distance estimates.

By way of example, the system 100 can apply circular distributions (e.g., as uncertainty rings) for detecting pedestrian entry/exit in a parking facility, such as elevators, escalators, stairs, etc. In probability statistics, a circular distribution is a probability distribution of a random variable whose values are angles, taken to be in the range [0, 2π]. A pedestrian exit can be anywhere on a ring having one parking spot as its center, excluding places such as ways and other known parking spots. The system 100 can collect such sensor data over many users and parking spots, to form a probability density map from all rings having high density at exit locations. In a multi-story parking facility, the system 100 can assume that that stairs and elevators are aligned between different levels, thereby greatly improving the estimation accuracy.

In one embodiment, the system 100 can construct probability density maps from individual parking events, and show the accumulation of the probability density at a particular pedestrian entry/exit (e.g., an elevator) location. A circular distribution can be continuous or discrete (e.g., circular lattice distributions). For instance, each of a first ring around a first parking spot, a second ring around a second parking spot, and a third ring around a third parking spot forms a probability density map that overlap in high probability density at a position of a pedestrian entry/exit.

As such, the system 100 can solve the issues of sensors-based navigation in a parking facility without positioning satellite coverage, whether towards available parking spots or towards the exits, by tracking sematic events (e.g., turns, inclination changes and parking instances, based on sensors embedded in mobile devices) thereby estimating parking locations. The system 100 can provide a smooth transition between in-parking navigation and standard out of parking navigation, real-time estimation of an occupancy level, analytics and prediction of occupancy levels, without cooperation or propriety information from parking facility operators.

Figure 3:
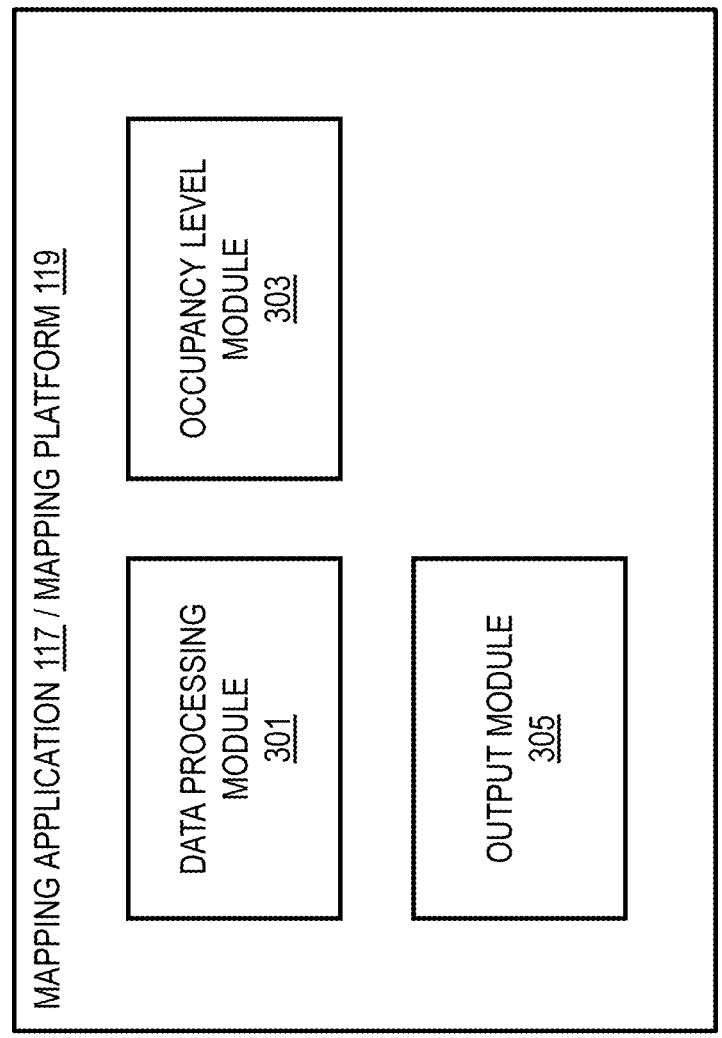
FIG. 3 is a diagram of a mapping application/mapping platform capable of in-parking navigation based on an estimated parking occupancy level, according to one embodiment.

FIG. 3 is a diagram of a mapping application/mapping platform capable of in-parking navigation based on an estimated parking occupancy level, according to one embodiment. In one embodiment, a mapping application 117 (e.g., a local component) and/or mapping platform 119 (e.g., a network/cloud component) may perform one or more functions or processes associated with in-parking navigation based on an estimated parking occupancy level (e.g., from the accelerometer 109 or equivalent sensors). By way of example, as shown in FIG. 3, the mapping application 117 and/or mapping platform 119 include one or more components for performing functions or processes of the various embodiments described herein. It is contemplated that the functions of these components may be combined or performed by other components of equivalent functionality. In one embodiment, the mapping application 117 and/or mapping platform 119 include a data processing module 301, an occupancy level module 303, and an output module 305. The above presented modules and components of the mapping application 117 and/or mapping platform 119 can be implemented in hardware, firmware, software, or a combination thereof. In one embodiment, the mapping application 117, mapping platform 119, and/or any of their modules 301-305 may be implemented as a cloud-based service, local service, native application, or combination thereof. The functions of mapping application 117, mapping platform 119, and modules 301-305 are discussed with respect to FIGS. 3-5 below.

Figure 4:
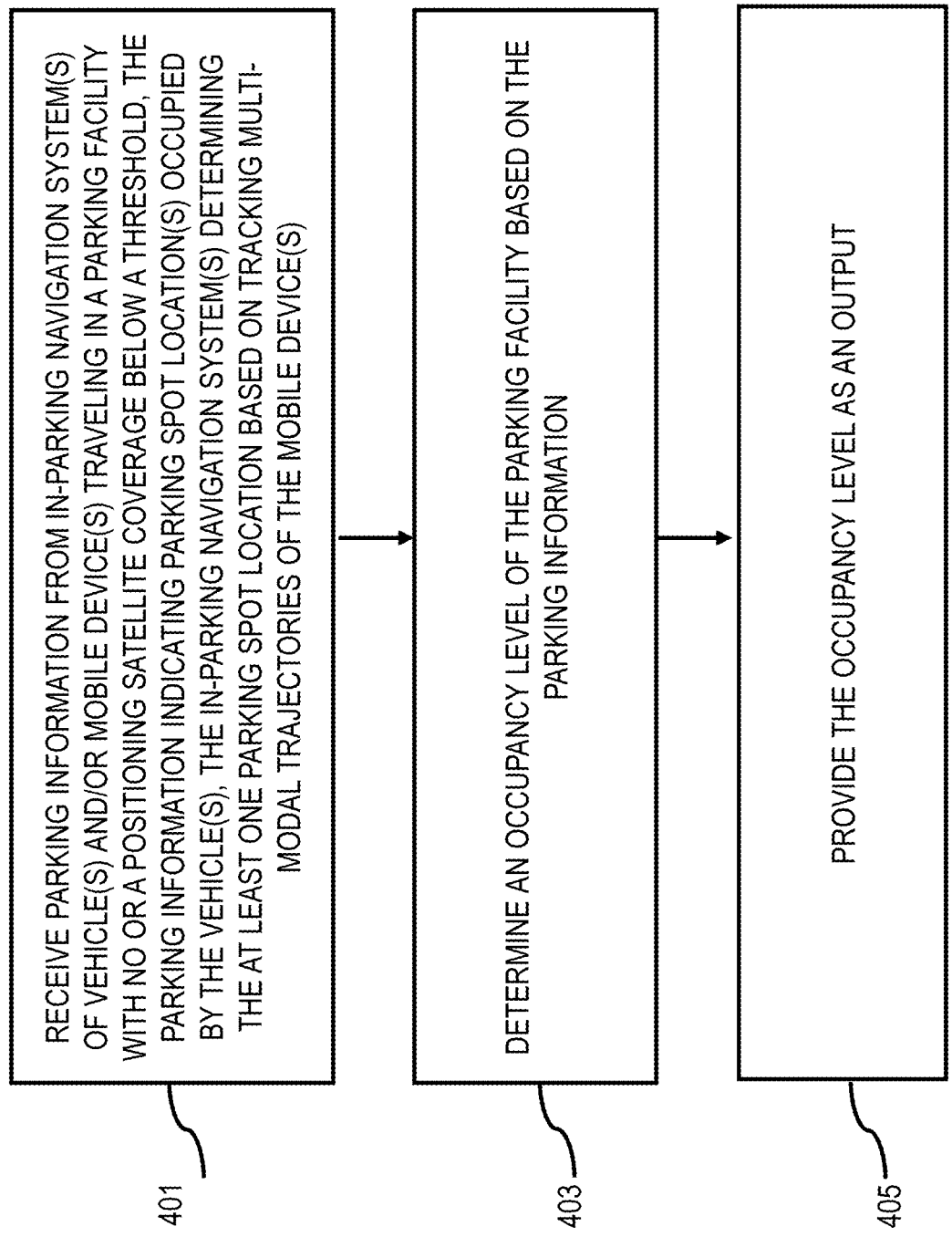
FIG. 4 is a flowchart of a process for in-parking navigation based on an estimated parking occupancy level, according to one embodiment.
Figure 8:
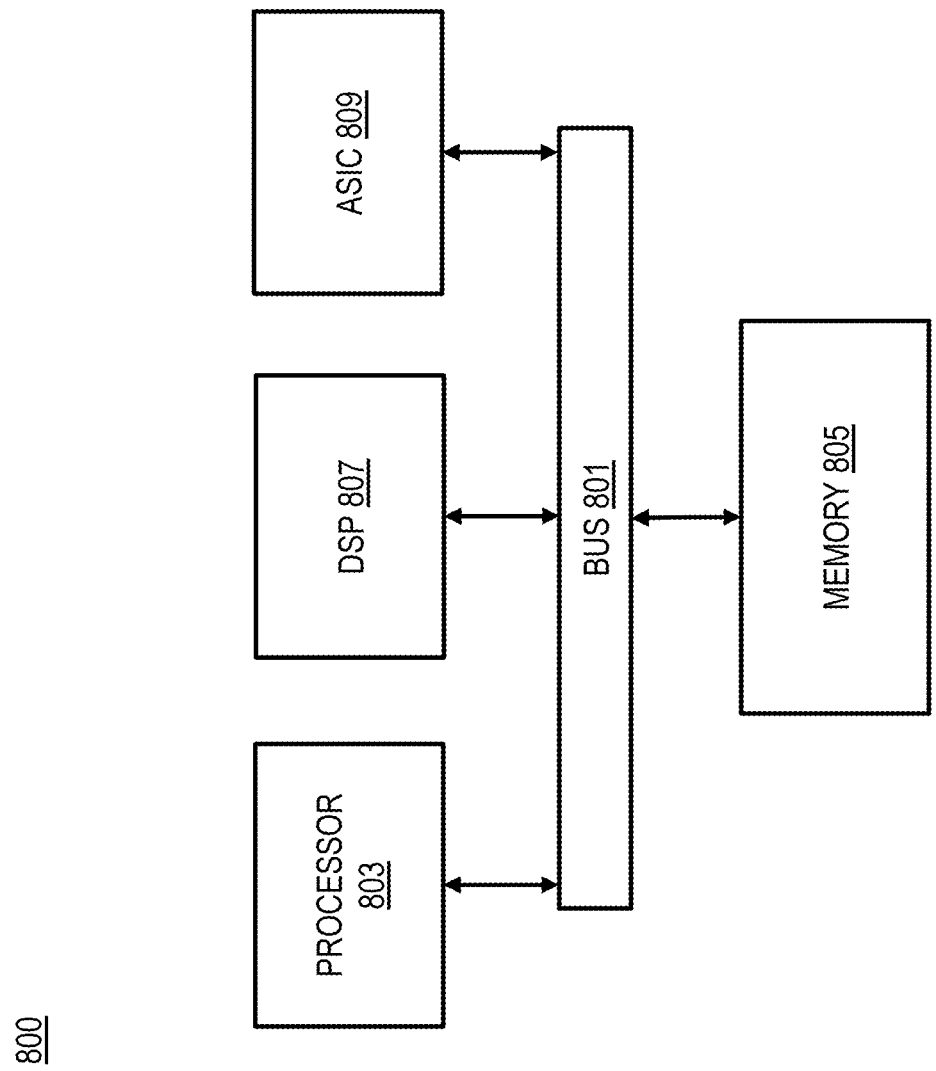
FIG. 8 is a diagram of a chip set that can be used to implement an embodiment.

FIG. 4 is a flowchart of a process for in-parking navigation based on an estimated parking occupancy level, according to one embodiment. In various embodiments, the mapping application 117, mapping platform 119, and/or any of their modules 301-305 may perform one or more portions of the process 400 and may be implemented in, for instance, a chip set including a processor and a memory as shown in FIG. 8. As such, the mapping application 117, mapping platform 119, and/or any of their modules 301-305 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In one embodiment, for example, in step 401, the data processing module 301 can receive parking information (e.g., parking space locations, orientations, parking event data as described later, etc.) from one or more in-parking navigation systems of one or more vehicles (e.g., the vehicles 101), one or more mobile devices (e.g., the UEs 105) associated with the one or more vehicles, or a combination thereof traveling in a parking facility (e.g., the parking facility 102) with no or a positioning satellite coverage below a threshold (e.g., unavailable and/or inaccessible). The parking information can indicate at least one parking spot location (e.g., the parking spot 207 in FIG. 2A) occupied by the one or more vehicles. The in-parking navigation systems can determine the at least one parking spot location based on tracking one or more multi-modal trajectories (e.g., the multi-modal trajectories 201 in FIG. 2A) of the one or more mobile devices (e.g., the UEs 105). The one or more multi-modal trajectories comprise one or more vehicle trajectory segments (e.g., the vehicle trajectory segment 201a) traveling within the parking facility and one or more pedestrian trajectory segments (e.g., the pedestrian trajectory segment 201b) traveling to or from one or more pedestrian entry or exit points (e.g., the pedestrian entry/exit 205) of the parking facility.

In one embodiment, the at least one parking spot location can be measured from a last junction (e.g., the junction node in FIG. 2B) detected in the one or more multi-modal trajectories.

In one embodiment, the parking information can be collected in real time, and the occupancy level can be a real-time occupancy level.

In one embodiment, in step 403, the occupancy level module 303 can determine an occupancy level (e.g., the estimate occupancy levels 215 in FIG. 2A) of the parking facility based on the parking information.

In another embodiment, the data processing module 301 can determine parking event data (e.g., parking event sequence data that includes all the semantic events required to characterize a parking event sequence, e.g., a vehicle trajectory segment) reported by the one or more in-parking vehicle navigations system, and then the occupancy level module 303 can process the parking event data using a machine learning model (e.g., the parked spot/occupancy level model) to determine the occupancy level of the parking facility. For instance, the data processing module 301 can extract one or more parking features from the parking event data, and provide the one or more parking features as input to the machine learning model. By way of example, the one or more parking features can comprise at least one of: a time to park; a distance of at least one parking spot to the one or more pedestrian entry or exit points, one or more vehicle entry or exit points, or a combination thereof; and a parking level or zone associated with the at least one parking spot location.

For instance, a parking event sequence can be a structured time sequence of semantic events, such as a scenario of a parallel parking event on the right-hand side of a road in reverse drive. The sequence can go as: the vehicle 101 in forward drive via the parking facility entrance—stop—a right lane shift in a reverse drive to back into a parking spot—stop/idle with engine on—potential correction maneuver(s) (such as short forward and backwards drives) to fit in the parking spot—stop with engine off. Other semantic events of vehicles/pedestrians can include inclination changes (e.g., taking a ramp), door open/close, getting on escalator/elevator/stairs, etc., thereby navigating the pedestrians to final destinations, back to the vehicle, etc.

In one embodiment, the system 100 extracts a plurality of known time-based semantic/maneuver event sequences of different parking locations and/or orientations from a stream of time-stamped raw data, e.g., sensor data 103 of the UEs 105, to establish semantic/maneuver event sequences for different parking locations and/or orientations. Each parking time-based semantic/maneuver event sequence includes a set of semantic/maneuver events, while each semantic/maneuver event is recorded as set of sensor values. The plurality of known sequences of semantic/maneuver events can be stored locally in the UEs 105, and/or in a geographic database.

In one embodiment, the system 100 can track vehicle speed, identify locations, turns, inclination change, and a radius of curvature of turns, as well as get detailed characterization of parking events. In one embodiment, the statistics of these vehicle semantic events can be collected and stored in a standard maps format (e.g., the open street map (OSM) format), thereby tagging junctions, aisle/driveways, parking spots, etc. into a parking event sequence. In another embodiment, the system 100 can track positions of actual parking spots by collecting information regarding parking events in between the junctions, considering a parking facility map. In another embodiment, the system 100 can detect positions of pedestrian arriving the exits/entrances (e.g., escalators, elevators, stairs, etc.) in the parking facility 102, using mobile device sensor data collected after user(s) leaving the vehicle 101, to provide further navigation services.

In yet another embodiment, the data processing module 301 can validate the machine learning model based on an observed time to park in the parking facility. For instance, a more vacant parking facility will exhibit a short time distribution centered around the time taken to reach the parking spots nearest to the entrance. The higher the occupancy level, the longer it takes to park.

In yet another embodiment, the data processing module 301 can determine one or more contextual features, the one or more contextual features can include pricing, user preferences, user priorities, correlations among nearby parking facilities, weather, time of a day, day of a week, day of a month, or a combination thereof, and the one or more contextual features can be provided as further input to the machine learning model. Other contextual features may include driving behaviors, parking behaviors, vehicle state data, transport modes, moving patterns, driveway topology, etc.

In one embodiment, in step 405, the output module 305 can providing the occupancy level of the parking facility as an output. In another embodiment, the output module 305 can generate navigation guidance information to the parking facility, another parking facility, or a combination thereof based on the occupancy level of the parking facility. In yet another embodiment, the output module 305 can generate an occupancy prediction model for the parking facility based on the occupancy level of the parking facility collected over time, and providing the occupancy prediction model to another in-parking navigation system. In yet another embodiment, the data processing module 301 can determine that a vehicle has entered the parking facility, switch from a positioning satellite based navigation (e.g., GPS) to an in-parking navigation system associated with the vehicle based on the determining, and work with the output module 305 to navigate, via the in-parking navigation system, the vehicle to a vacant space based on the occupancy level of the parking facility.

Figure 5A:
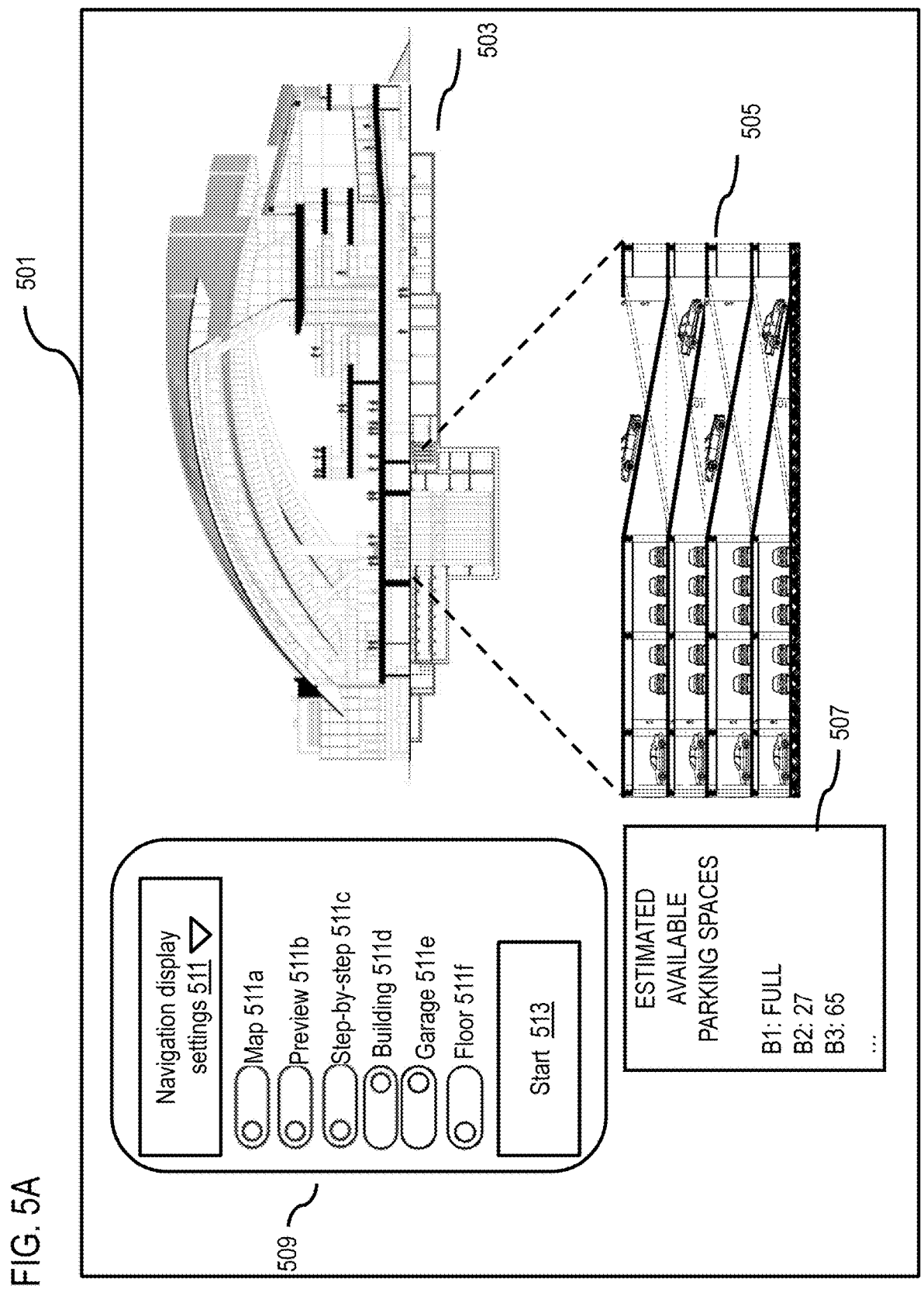
FIG. 5A is a diagram of a user interface associated parking navigation, according to one embodiment.

FIG. 5A is a diagram of a user interface associated parking navigation, according to one embodiment. In this example, the UI 501 shown may be generated for a UE 105 (e.g., a mobile device, an embedded navigation system of the vehicle 101, a driving trainer terminal, a server of a vehicle fleet operator, a server of a vehicle insurer, etc.) that depicts a building view 503 and a parking diagram 505. The UI 501 further displays estimate of occupancy levels 507 as "Estimated Available Parking Spaces: B1: FULL, B2: 27, B3: 65."

The UI 501 further shows a display setting panel 509 that includes a navigation display setting dropdown menu 511 with a plurality of display setting switches, and an input 513 of "Start." By way of example, the parking setting feature switches included Map 511a, Preview 511b, Step-by-step 511c, Building 511d, Garage 511e, Floor 511f, etc.

In this case, the display settings: the building 511d and the Garage 511e are switched on by a user (e.g., a driver, a passenger, a driving instructor, a vehicle fleet management personnel, a vehicle insurance personnel, etc. with different levels of data access based on credentials). The user can be a human and/or artificial intelligence. For instance, the building view 503 shows a concert hall, and the parking diagram 505 shows an underground garage of the concert hall.

Figure 5B:
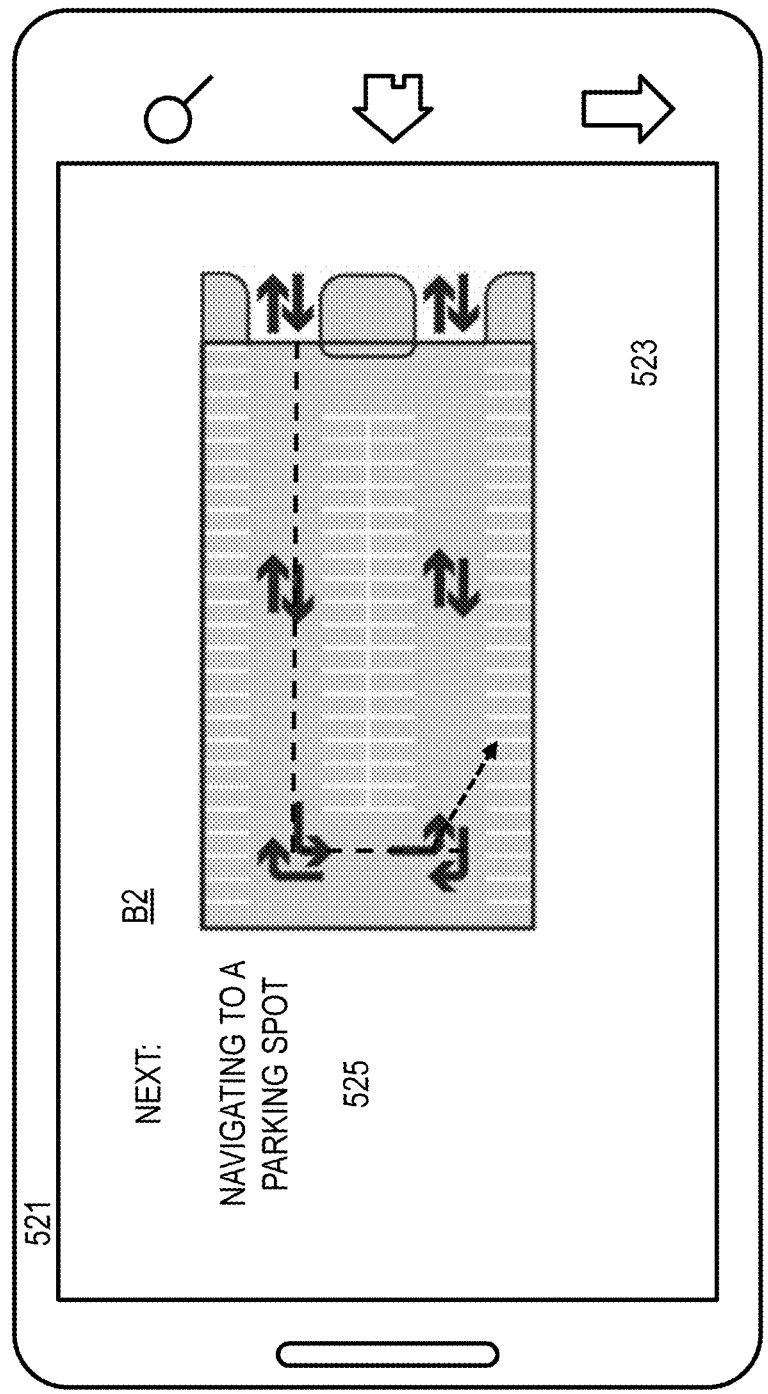
FIG. 5B is a diagram of an example user interface showing a parking floor, according to one embodiment.

FIG. 5B is a diagram of an example user interface showing a parking floor B2, according to one embodiment. In this example, a UI 521 shown is generated for the UE 105 that includes a parking floor diagram 523. By way of example, the system 100 can detect that the vehicle 101 enters the underground garage of the concert hall, and start navigating the vehicle 101 to a vacant parking spot by automatically displaying a cue 525: "Next: navigating to a parking spot." Alternatively, the UI 521 can be triggered by a user input. Subsequently, the system 100 can present a preview of the maneuver sequences to park into the underground parking spot.

In one embodiment, the system 100 can set different users with different access rights to different navigation display settings as well as different granular levels within each data feature. When the user selectively switches on the other navigation display settings, the system 100 can factor in additional navigation display setting(s) to compute the next sequence of representations using, for example, the process 400.

In another embodiment, the system 100 may be configured to dynamically, in real-time, or substantially in real-time, adjust the next sequence of navigation display settings based on demand and supply changes in the parking spaces, customers, etc. and display on the UI 521 accordingly. In yet another embodiment, the system 100 may be configured to dynamically, in real-time, or substantially in real-time, adjust the next sequence of parking representations based on other contextual changes in weather, parking costs, etc.

In other embodiments, the parking event data 121 and/or the parking facility occupancy level data can be provided by the output module 305 as an output over the communications network 123 to a service platform 125 including one or more services 127a-127k (also referred to as services 127). As discussed above, the services 127 can include, but are not limited to, mapping services, navigation services, parking guiding services, driving training services, vehicle insurance services, and/or the like that can combine the parking event data 121 with the parking facility occupancy level data, and/or digital map data (e.g., the geographic database 131) to provide location-based services. It is also contemplated that the services 127 can include any service that uses the parking event data 121 and/or the parking facility occupancy level data to provide or perform any function. In one embodiment, the parking event data 121 and/or the parking facility occupancy level data can also be used by one or more content providers 129a-129j (also collectively referred to as content providers 129). These content providers 129 can aggregate and/or process the parking event data 121 and/or the parking facility occupancy level data to provide the processed data to its users such as the service platform 125 and/or services 127. The sensor data 103 and/or the parking event data 121 cab be stored in a stand-alone database, or the geographic database 131 that also stores map data.

Returning to FIG. 1, the system 100 comprises one or more vehicles 101 associated with one or more UEs 105 having respective mapping modules 117 and/or connectivity to the mapping platform 119. The UE 105 can be mounted to the dashboard or other fixed position within the vehicle 101 or carried by a driver/passenger of the vehicle 101. The sensors can be standalone sensors within the UE 105 or part of an IMU 115 within the UE 105. It is noted, however, that embodiments in which the sensors are included within the UE 105 are provided by way of illustration and not as a limitation. In other embodiments, it is contemplated that the sensors (e.g., the magnetometer 113 and/or accelerometer 109) may be mounted externally to the UE 105 (e.g., as a component of the vehicle 101 or other device within the vehicle 101). In addition, the mapping application 117 for calculating the distances or other parking characteristic/information and tracking parking locations of the vehicle 101, thereby determining an occupancy level of the parking facility, according to the embodiments described herein need not reside within the UE 105 and can also be included as a component of the vehicle 101 and/or any other device internal or external to the vehicle 101.

By way of example, the UEs 105 may be a personal navigation device ("PND"), a cellular telephone, a mobile phone, a personal digital assistant ("PDA"), a watch, a camera, a computer, an in-vehicle or embedded navigation system, and/or other device that is configured with multiple sensor types (e.g., accelerometers 109, magnetometers 113, etc.) that can be used for determined vehicle speed according to the embodiments described herein. It is contemplated, that the UE 105 (e.g., cellular telephone or other wireless communication device) may be interfaced with an on-board navigation system of an autonomous vehicle or physically connected to the vehicle 101 for serving as a navigation system. Also, the UEs 105 and/or vehicles 101 may be configured to access the communications network 123 by way of any known or still developing communication protocols. Via this communications network 123, the UEs 105 and/or vehicles 101 may transmit sensor data collected from IMU or equivalent sensors for facilitating vehicle speed calculations.

The UEs 105 and/or vehicles 101 may be configured with multiple sensors of different types for acquiring and/or generating sensor data according to the embodiments described herein. For example, sensors may be used as GPS or other positioning receivers for interacting with one or more location satellites to determine and track the current speed, position and location of a vehicle travelling along a roadway. In addition, the sensors may gather IMU data, NFC data, Bluetooth data, acoustic data, barometric data, tilt data (e.g., a degree of incline or decline of the vehicle during travel), motion data, light data, sound data, image data, weather data, temporal data and other data associated with the vehicle and/or UEs 105 thereof. Still further, the sensors may detect local or transient network and/or wireless signals, such as those transmitted by nearby devices during navigation of a vehicle along a roadway. This may include, for example, network routers configured within a premise (e.g., home or business), another UE 105 or vehicle 101 or a communicable traffic system (e.g., traffic lights, traffic cameras, traffic signals, digital signage).

By way of example, the mapping application 117 and/or mapping platform 119 may be implemented as a cloud-based service, hosted solution or the like for performing the above described functions. Alternatively, the mapping application 117 and/or mapping platform 119 may be directly integrated for processing data generated and/or provided by the service platform 125, one or more services 127, and/or content providers 129. Per this integration, the mapping platform 119 may perform client-side state computation of vehicle speed data.

By way of example, the communications network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 105 can support any type of interface to the user (such as "wearable" circuitry, etc.).

By way of example, the UE 105s, the mapping application 117, the mapping platform 119, the service platform 125, and the content providers 129 communicate with each other and other components of the communications network 123 using well known, new or still developing protocols. In this context, a protocol includes a set of rules defining how the network nodes within the communications network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
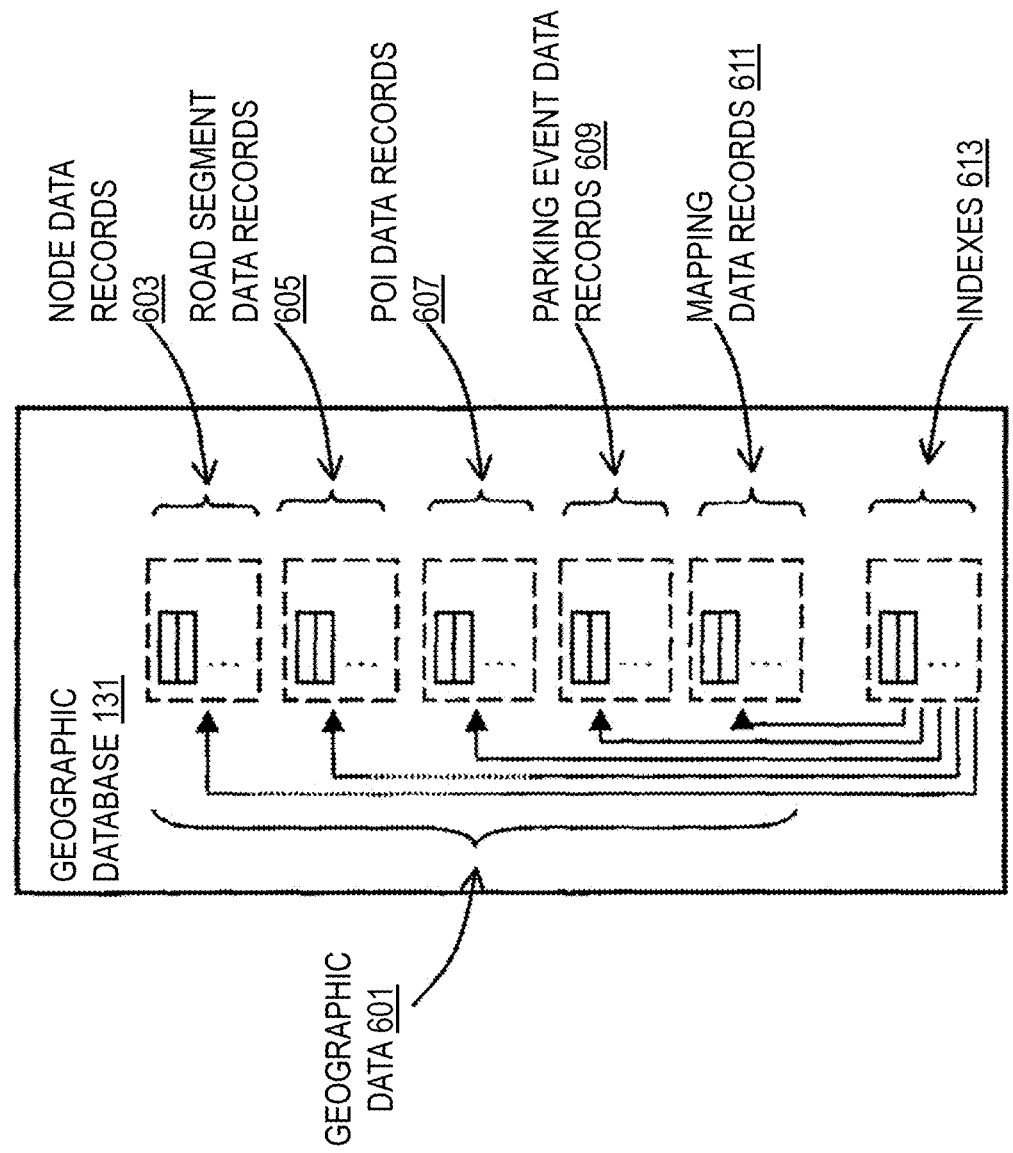
FIG. 6 is a diagram of a geographic database, according to one embodiment.

FIG. 6 is a diagram of a geographic database (such as the database 131), according to one embodiment. In one embodiment, the geographic database 131 includes geographic data 601 used for (or configured to be compiled to be used for) mapping and/or navigation-related services, such as for video odometry based on the parametric representation of lanes include, e.g., encoding and/or decoding parametric representations into lane lines. In one embodiment, the geographic database 131 include high resolution or high definition (HD) mapping data that provide centimeter-level or better accuracy of map features. For example, the geographic database 131 can be based on Light Detection and Ranging (LiDAR) or equivalent technology to collect billions of 3D points and model road surfaces and other map features down to the number lanes and their widths. In one embodiment, the mapping data (e.g., mapping data records 611) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 131.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 131 follows certain conventions. For example, links do not cross themselves and do not cross each other except at a node. Also, there are no duplicated shape points, nodes, or links. Two links that connect each other have a common node. In the geographic database 131, overlapping geographic features are represented by overlapping polygons. When polygons overlap, the boundary of one polygon crosses the boundary of the other polygon. In the geographic database 131, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 131 includes node data records 603, road segment or link data records 605, POI data records 607, parking event data records 609, mapping data records 611, and indexes 613, for example. More, fewer or different data records can be provided. In one embodiment, additional data records (not shown) can include cartographic ("cartel") data records, routing data, and vehicle event data. In one embodiment, the indexes 613 may improve the speed of data retrieval operations in the geographic database 131. In one embodiment, the indexes 613 may be used to quickly locate data without having to search every row in the geographic database 131 every time it is accessed. For example, in one embodiment, the indexes 613 can be a spatial index of the polygon points associated with stored feature polygons.

In exemplary embodiments, the road segment data records 605 are links or segments representing roads, streets, or paths, as can be used in the calculated route or recorded route information for determination of one or more personalized routes. The node data records 603 are end points corresponding to the respective links or segments of the road segment data records 605. The road link data records 605 and the node data records 603 represent a road network, such as used by vehicles, vehicles, and/or other entities. Alternatively, the geographic database 131 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 131 can include data about the POIs and their respective locations in the POI data records 607. The geographic database 131 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a position of a city).

In one embodiment, the geographic database 131 can also include parking event data records 609 for storing sensor data, parking event data, historical parking event data, parking semantic event data, parking facility map data, parking facility occupancy level data, training data, event prediction models, annotated event observations, computed event distributions, sampling probabilities, and/or any other data generated or used by the system 100 according to the various embodiments described herein. By way of example, the parking event data records 609 can be associated with one or more of the node records 603, road segment records 605, and/or POI data records 607 to support localization or visual odometry based on the features stored therein and the corresponding estimated quality of the features. In this way, the records 609 can also be associated with or used to classify the characteristics or metadata of the corresponding records 603, 605, and/or 607.

In one embodiment, as discussed above, the mapping data records 611 model road surfaces and other map features to centimeter-level or better accuracy. The mapping data records 611 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 611 are divided into spatial partitions of varying sizes to provide mapping data to vehicles 101 and other end user devices with near real-time speed without overloading the available resources of the vehicles 101 and/or devices (e.g., computational, memory, bandwidth, etc. resources).

In one embodiment, the mapping data records 611 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 611.

In one embodiment, the mapping data records 611 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 131 can be maintained by the content provider 131 in association with the services platform 125 (e.g., a map developer). The map developer can collect geographic data to generate and enhance the geographic database 131. There can be different ways used by the map developer to collect data. These ways can include obtaining data from other sources, such as municipalities or respective geographic authorities. In addition, the map developer can employ field personnel to travel by vehicle (e.g., vehicles 101 and/or UEs 105) along roads throughout the geographic region to observe features and/or record information about them, for example. Also, remote sensing, such as aerial or satellite photography, can be used.

The geographic database 131 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for in-parking navigation based on an estimated parking occupancy level may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
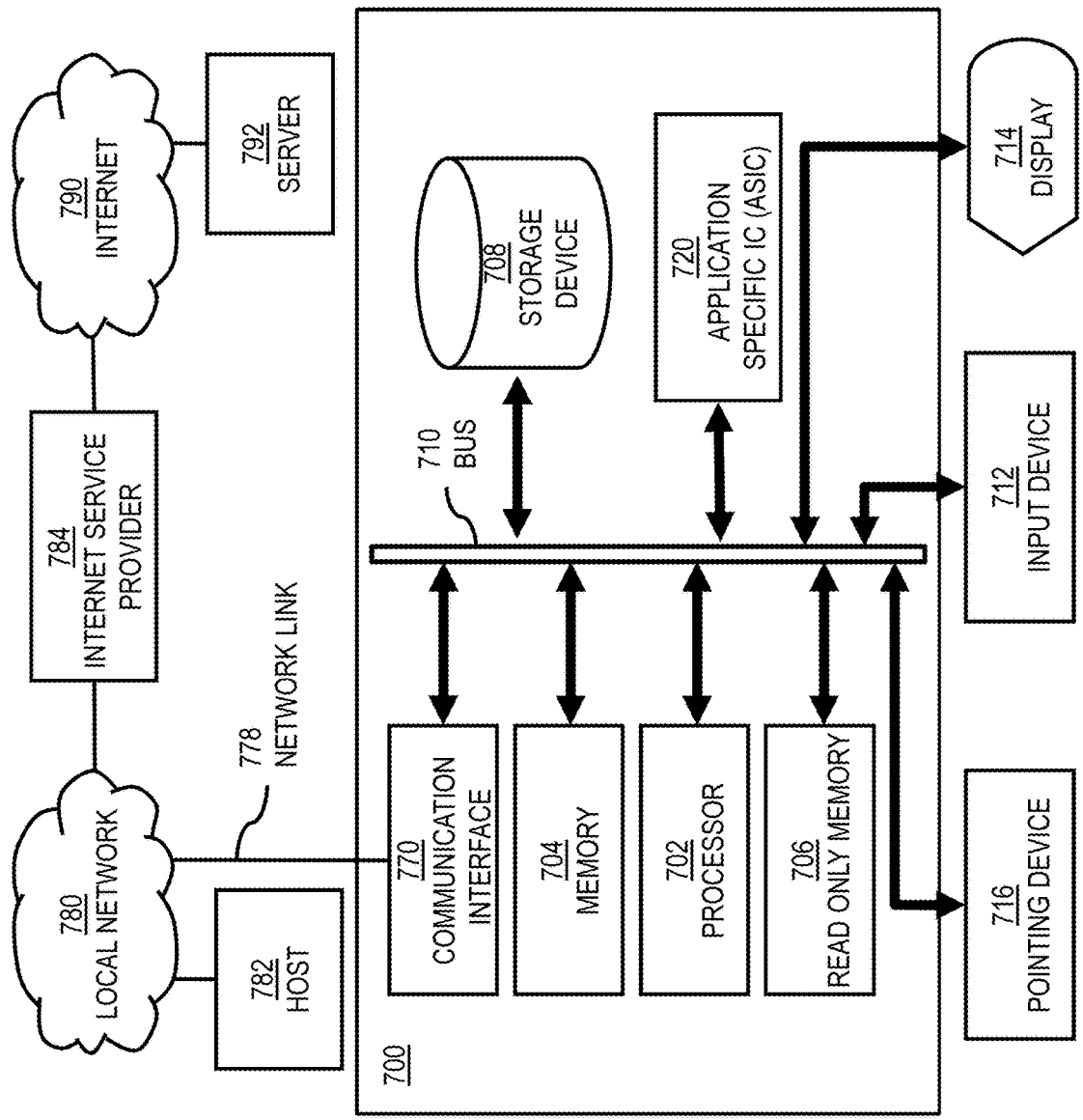
FIG. 7 is a diagram of hardware that can be used to implement an embodiment.

FIG. 7 illustrates a computer system 700 upon which an embodiment of the invention may be implemented. Computer system 700 is programmed (e.g., via computer program code or instructions) to provide in-parking navigation based on an estimated parking occupancy level as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to in-parking navigation based on an estimated parking occupancy level. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RANI) or other dynamic storage device, stores information including processor instructions for in-parking navigation based on an estimated parking occupancy level. Dynamic memory allows information stored therein to be changed by the computer system 700. RANI allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, which is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, which persists even when the computer system 700 is turned off or otherwise loses power.

Information, including instructions for in-parking navigation based on an estimated parking occupancy level, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, which carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 123 for in-parking navigation based on an estimated parking occupancy level (e.g., from the UE 105).

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system can be deployed in various configurations within other computer systems, e.g., host 782 and server 792.

FIG. 8 illustrates a chip set 800 upon which an embodiment of the invention may be implemented. Chip set 800 is programmed to provide in-parking navigation based on an estimated parking occupancy level as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide in-parking navigation based on an estimated parking occupancy level. The memory 805 also stores the data associated with or generated by the execution of the inventive steps.

Figure 9:
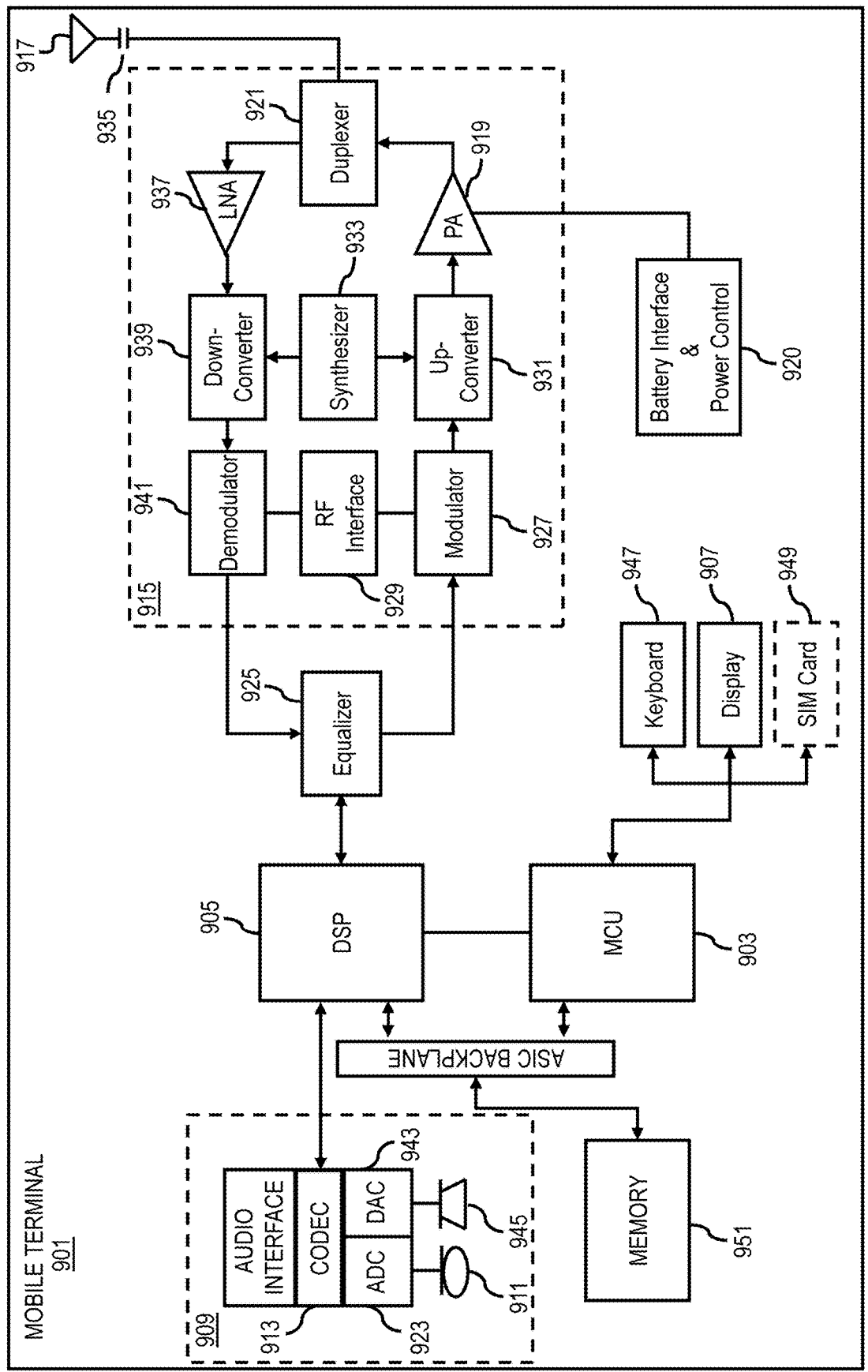
FIG. 9 is a diagram of a mobile terminal that can be used to implement an embodiment.

FIG. 9 is a diagram of exemplary components of a mobile terminal 901 (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (Wi-Fi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to provide in-parking navigation based on an estimated parking occupancy level. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving parking information from one or more in-parking navigation systems of one or more vehicles, one or more mobile devices associated with the one or more vehicles, or a combination thereof traveling in a parking facility with no or a positioning satellite coverage below a threshold, wherein the parking information indicates at least one parking spot location occupied by the one or more vehicles, wherein the in-parking navigation systems determine the at least one parking spot location based on tracking one or more multi-modal trajectories of the one or more mobile devices, wherein the one or more multi-modal trajectories comprise one or more vehicle trajectory segments traveling within the parking facility and one or more pedestrian trajectory segments traveling to or from one or more pedestrian entry or exit points of the parking facility, and wherein the at least one parking spot location is measured from a last junction detected in the one or more multi-modal trajectories;
determining an occupancy level of the parking facility based on the parking information; and
providing the occupancy level of the parking facility as an output.

2. The method of claim 1, further comprising:
generating navigation guidance information to the parking facility, another parking facility, or a combination thereof based on the occupancy level of the parking facility.

3. The method of claim 1, further comprising:
generating an occupancy prediction model for the parking facility based on the occupancy level of the parking facility collected over time; and
providing the occupancy prediction model to another in-parking navigation system.

4. The method of claim 1, further comprising:
determining parking event data reported by the one or more in-parking vehicle navigations system; and
processing the parking event data using a machine learning model to determine the occupancy level of the parking facility.

5. The method of claim 4, further comprising:
extracting one or more parking features from the parking event data; and
providing the one or more parking features as input to the machine learning model.

6. The method of claim 5, wherein the one or more parking features comprises at least one of:
a time to park;
a distance of at least one parking spot to the one or more pedestrian entry or exit points, one or more vehicle entry or exit points, or a combination thereof; and
a parking level or zone associated with the at least one parking spot location.

7. The method of claim 5, further comprising:
determining one or more contextual features,
wherein the one or more contextual features include pricing, user preferences, user priorities, correlations among nearby parking facilities, weather, time of a day, day of a week, day of a month, or a combination thereof; and
wherein the one or more contextual features are provided as further input to the machine learning model.

8. The method of claim 4, further comprising:
validating the machine learning model based on an observed time to park in the parking facility.

9. The method of claim 1, wherein the parking information is collected in real time, and wherein the occupancy level is a real-time occupancy level.

10. The method of claim 2, further comprising:
determining that a vehicle has entered the parking facility;
switching from a positioning satellite based navigation to an in-parking navigation system associated with the vehicle based on the determining; and
navigating, via the in-parking navigation system, the vehicle to a vacant space based on the occupancy level of the parking facility.

11. An apparatus comprising:
at least one processor; and
at least one memory including computer program code for one or more programs,
the at least one memory and the computer program code configured to, with the at least one processor, cause the apparatus to perform at least the following,
receive parking information from one or more in-parking navigation systems of one or more vehicles, one or more mobile devices associated with the one or more vehicles, or a combination thereof traveling in a parking facility with no or a positioning satellite coverage below a threshold, wherein the parking information indicates at least one parking spot location occupied by the one or more vehicles, wherein the in-parking navigation systems determine the at least one parking spot location based on tracking one or more multi-modal trajectories of the one or more mobile devices, wherein the one or more multi-modal trajectories comprise one or more vehicle trajectory segments traveling within the parking facility and one or more pedestrian trajectory segments traveling to or from one or more pedestrian entry or exit points of the parking facility, and wherein the at least one parking spot location is measured from a last junction detected in the one or more multi-modal trajectories;
determine an occupancy level of the parking facility based on the parking information; and
provide the occupancy level of the parking facility as an output.

12. The apparatus of claim 11, wherein the apparatus is further caused to:
generate navigation guidance information to the parking facility, another parking facility, or a combination thereof based on the occupancy level of the parking facility.

13. The apparatus of claim 11, wherein the apparatus is further caused to:
generate an occupancy prediction model for the parking facility based on the occupancy level of the parking facility collected over time; and
provide the occupancy prediction model to another in-parking navigation system.

14. The apparatus of claim 11, wherein the apparatus is further caused to:
determine parking event data reported by the one or more in-parking vehicle navigations system; and
process the parking event data using a machine learning model to determine the occupancy level of the parking facility.

15. The apparatus of claim 14, wherein the apparatus is further caused to:
extract one or more parking features from the parking event data; and
provide the one or more parking features as input to the machine learning model.

16. A non-transitory computer-readable storage medium carrying one or more sequences of one or more instructions which, when executed by one or more processors, cause an apparatus to perform:
receiving parking information from one or more in-parking navigation systems of one or more vehicles, one or more mobile devices associated with the one or more vehicles, or a combination thereof traveling in a parking facility with no or a positioning satellite coverage below a threshold, wherein the parking information indicates at least one parking spot location occupied by the one or more vehicles, wherein the in-parking navigation systems determine the at least one parking spot location based on tracking one or more multi-modal trajectories of the one or more mobile devices, wherein the one or more multi-modal trajectories comprise one or more vehicle trajectory segments traveling within the parking facility and one or more pedestrian trajectory segments traveling to or from one or more pedestrian entry or exit points of the parking facility, and wherein the at least one parking spot location is measured from a last junction detected in the one or more multi-modal trajectories;

determining an occupancy level of the parking facility based on the parking information; and providing the occupancy level of the parking facility as an output.

17. The non-transitory computer-readable storage medium of claim 16, wherein the apparatus is caused to further perform:

generating navigation guidance information to the parking facility, another parking facility, or a combination thereof based on the occupancy level of the parking facility.

18. The non-transitory computer-readable storage medium of claim 16, wherein the apparatus is caused to further perform:

generating an occupancy prediction model for the parking facility based on the occupancy level of the parking facility collected over time; and providing the occupancy prediction model to another in-parking navigation system.

* * * * *